(12) United States Patent
Lin

(10) Patent No.: US 7,362,354 B2
(45) Date of Patent: Apr. 22, 2008

(54) METHOD AND SYSTEM FOR ASSESSING THE PHOTO QUALITY OF A CAPTURED IMAGE IN A DIGITAL STILL CAMERA

(75) Inventor: Qian Lin, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 752 days.

(21) Appl. No.: 10/074,179

(22) Filed: Feb. 12, 2002

(65) Prior Publication Data

US 2003/0151674 A1 Aug. 14, 2003

(51) Int. Cl.
*H04N 5/228* (2006.01)
*H04N 5/222* (2006.01)

(52) U.S. Cl. .............................. 348/222.1; 348/333.04

(58) Field of Classification Search ............. 348/222.1, 348/228.1, 364, 365, 675, 678, 221.1, 333.11, 348/333.02, 333.04, 333.05; 382/118, 117, 382/103, 282, 167, 274; 396/287, 281, 373, 396/374
See application file for complete search history.

(56) References Cited

U.S. PATENT DOCUMENTS

| | | | |
|---|---|---|---|
| 4,862,277 A | 8/1989 | Iwaibana | |
| 5,773,810 A | 6/1998 | Hussey et al. | |
| 6,016,354 A | 1/2000 | Lin et al. ................... | 382/117 |
| 6,134,339 A * | 10/2000 | Luo ............................ | 382/117 |
| 6,298,198 B1 | 10/2001 | Ina et al. | |
| 6,463,173 B1 * | 10/2002 | Tretter ........................ | 382/162 |
| 6,577,821 B2 * | 6/2003 | Malloy Desormeaux .... | 396/374 |
| 2002/0191861 A1 * | 12/2002 | Cheatle ....................... | 382/282 |
| 2003/0112361 A1 * | 6/2003 | Cooper ........................ | 348/364 |

FOREIGN PATENT DOCUMENTS

| | | |
|---|---|---|
| JP | 11067722 | 3/1999 |
| JP | 11325685 | 5/2001 |

OTHER PUBLICATIONS

Granger, Edward M. "Image Quality of Digital Cameras." IS&T's 1998 PICS Conference. pp. 188-191.
Shaw, Rodney. "Quantum Efficiency Considerations in the Comparison of Analog and Digital Photography." IS&T's 1998 PICS Conference. pp. 165-166.
Tsapatsoulis, Nicolas, et al. "Efficient Face Detection For Multimedia Applications." Department of Electrical and Computer Engineering, National Technical University of Athens.
Engeldrum, Peter G. "Image Quality Modeling: Where Are We?" IS&T's 1999 PICS Conference, pp. 251-255.
Kawaguchi, Tsuyoshi, et al. "Detection of Eyes from Human Faces By Hough Transform and Separability Filter." Department of Computer Science and Intelligent Systems, Oita University.

(Continued)

*Primary Examiner*—Aung S. Moe

(57) ABSTRACT

A method for assessing the photo quality of a captured image in a digital camera comprises the steps of checking in-camera the photo quality of the captured image to determine if the photo quality is acceptable, and providing a corresponding photo quality feedback to a camera user.

23 Claims, 10 Drawing Sheets

OTHER PUBLICATIONS

"Laser Focus World-Optoelectronics and Laser Technology Advances" [on-line] [retrieved on Jul. 12, 2001] Retrieved from Laser World Focus.

Takizaw a, Naruo, et al. "The Development of 1M-Pixel Digital Still Camera." IS&T's 1998 PICS Conference, pp. 64-66.

Saito, Osame, et al. "Signal Processing System for High-Resolution Digital Camera." IS&T'1999 PICS Conference. pp. 76-79.

Database WPI Section E1, week 200369 Derwent Publications Ltd., London, GB; Class Wo4, AN 2003-724019 & JP 2001 145117 A (olymus Optical Co. Ltd), May 25, 2001.

Database WPI, Section Ch, Week 200114, Derwent Publications Ltd., London, GB; XP002270963 & JP 2000 262501 A (Fuji Photo Film Co.) LTD, Sep. 29, 2000.

Je-Ho Lee et al: "Implementation of a Passive Automatic Focusing Algorithm for Digital Still Camera" IEEE Transactions on consumer Electronics, IIII Inc. NY, US vol. 41, No. 3, Aug. 1, 1995.

Wen-Hsin Chan et al: "Video CCD Based Protable Digital Still Camera" IEEE transactions on Consuer Electronics, IEEE Inc, NY, US, vol. 41, No. 3 Aug. 1, 1995.

\* cited by examiner

METHOD AND SYSTEM FOR ASSESSING THE PHOTO QUALITY OF A CAPTURED IMAGE IN A DIGITAL STILL CAMERA

BACKGROUND OF THE INVENTION

The present invention relates generally to digital image processing and more particularly to a method and system for assessing in-camera the photo quality of a captured digital image for the purpose of providing the digital still camera user with photo quality feedback.

PRIOR ART

Digital image processing is generally concerned with improving a captured image in some way or extracting information from it for further processing. Typical operations include removing the blur from a captured image, smoothing out the graininess, speckle or noise in the image, improving the contrast of the image prior to displaying it, segmenting an image into regions such as object and background, magnifying or rotating the image, etc. Digital images may be created from conventional photographic prints, negatives, or slides using a scanner or by taking a picture directly using a digital still camera.

A digital still camera includes in part a CCD (charge-coupled device) or CMOS (complementary metal oxide semiconductor) sensor, a lens, a viewfinder and a flat LCD (liquid crystal display) screen which is used as a live viewfinder while in capture mode or to preview a captured image. Unfortunately, the displayed LCD image is generally too small and too low in resolution to let the user accurately assess the photo quality of the captured image before proceeding with printing the picture. Also, LCDs tend to wash out when shooting outdoors under any but the most overcast sky. In general, size, resolution and brightness of the LCD screen are important factors for the user to consider when purchasing a digital camera as digital camera cost rises with increased LCD size and/or resolution. Ironically, it is the quality of the image being previewed on the LCD screen that will determine how accurately the user can judge whether to keep the picture just taken or to delete the same and attempt to retake the picture under better conditions. The alternative is to view an enlarged version of the picture just taken on a computer monitor to make a more accurate photo quality assessment which is a rather time consuming and impractical process, especially in the field.

Digital photography in general presents unique challenges to the average user. One such challenge has to do with color photo quality. Although digital cameras have the potential to achieve extremely high color photo quality, the flexibility and ease of manipulation produce generally inferior results if the user is not sufficiently skilled in photography. Inferior results would include flat, saturated or desaturated images with variable preservation of highlights or shades. Moreover, how a digital camera maps the dynamic range recorded on the CCD/CMOS image sensor to the output image file has profound impact on color photo quality. Digital cameras often wash out large important parts of images, e.g. the sky, which may be caused by over exposure leading to excessive saturation (flare). Unlike conventional photography, this type of over-exposure cannot be corrected after the image is captured since once the pixels saturate, the image information is lost. Obviously, if the digital camera was designed as a more "intelligent" device, i.e. capable of providing objective photo quality feedback to the user, the entire picture taking and previewing process would be made much more efficient.

SUMMARY OF THE INVENTION

The present invention is directed to a method for assessing the photo quality of a captured image in a digital camera. The method comprises the steps of checking in-camera the photo quality of the captured image to determine if the photo quality is acceptable, and providing a corresponding photo quality feedback to a camera user.

These and other aspects of the present invention will become apparent from a review of the accompanying drawings and the following detailed description of the preferred embodiments of the present invention.

BRIEF DESCRIPTION OF THE DRAWINGS

The invention is generally shown by way of example in the accompanying drawings in which.

DETAILED DESCRIPTION OF THE PREFERRED EMBODIMENTS

The present invention is directed to a method for assessing in-camera the photo quality of an image captured with a digital still camera. The method includes configuring the digital still camera (preferably) at the time of manufacture to check the photo quality of the captured image and provide appropriate photo quality feedback to the camera user so that the user can make an objective determination whether to keep or re-take the image. The digital still camera automatically checks photo quality on the basis of three photo quality attributes—(a) photo sharpness, (b) face quality, and (c) presence/absence of flare. Specifically, the digital still camera computes a figure of merit for each of the three photo quality attributes and then compares each figure of merit to a respective pre-set threshold to determine if the figure of merit exceeds the threshold. If all thresholds are exceeded, the camera notifies the user that the captured image is of acceptable quality.

Figure 1:
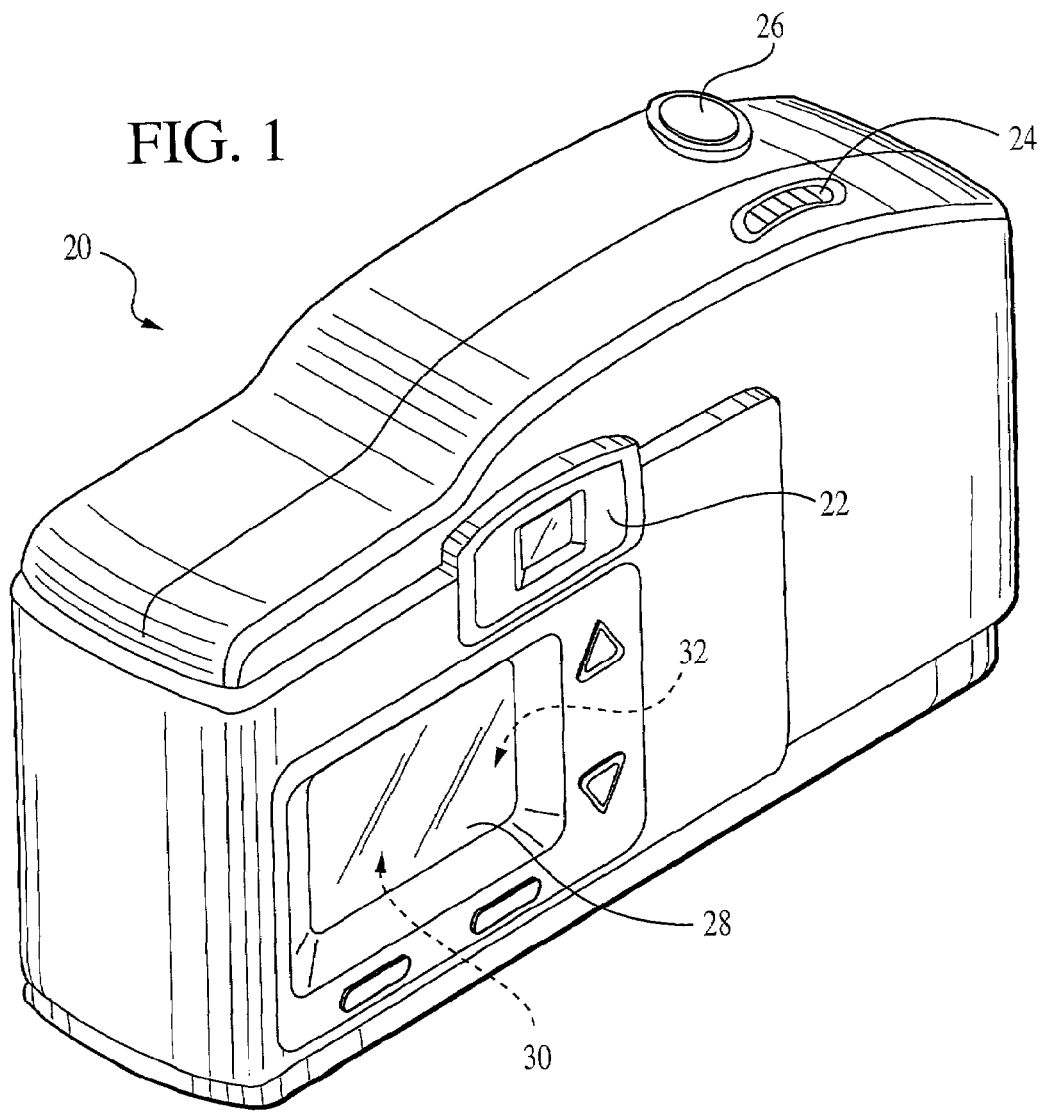
FIG. 1 is a side perspective view of a digital still camera with a LCD preview screen for use in accordance with one embodiment of the present invention.

As generally depicted in FIG. 1, a digital still camera 20, having a viewfinder 22, a power switch 24, a shutter 26, and a LCD preview screen 28, is preferably configured at the time of manufacture to automatically check in-camera the photo quality of a captured image (color photo) using a custom-made built-in ASIC (application specific integrated circuit—not shown), DSP (digital signal processor—not shown) or general purpose processor (not shown) and provide photo quality feedback to the user. Typically, the camera user previews a thumbnail version of a captured image, e.g. image 30 (FIG. 2) or image 32 (FIG. 3), on LCD screen 28 in an attempt to make a preliminary subjective determination on the photo quality of the captured image. Such a determination is generally not an easy task to accomplish for the average user as LCD screen 28 is of relatively small size and low resolution to allow the user to more objectively assess the photo quality of the captured image.

Figure 2:
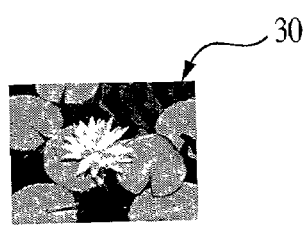
FIG. 2 is a first thumbnail image of an object and background displayed on the LCD preview screen of the digital camera of FIG. 1.
Figure 3:
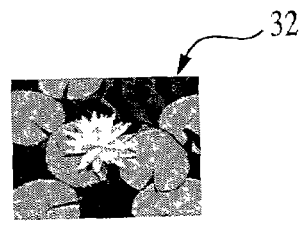
FIG. 3 is a second thumbnail image of the same object and background displayed on the LCD preview screen of the digital camera of FIG. 1.
Figure 4:
FIG. 4 is an enlarged view of the first thumbnail image of FIG. 2.
Figure 5:
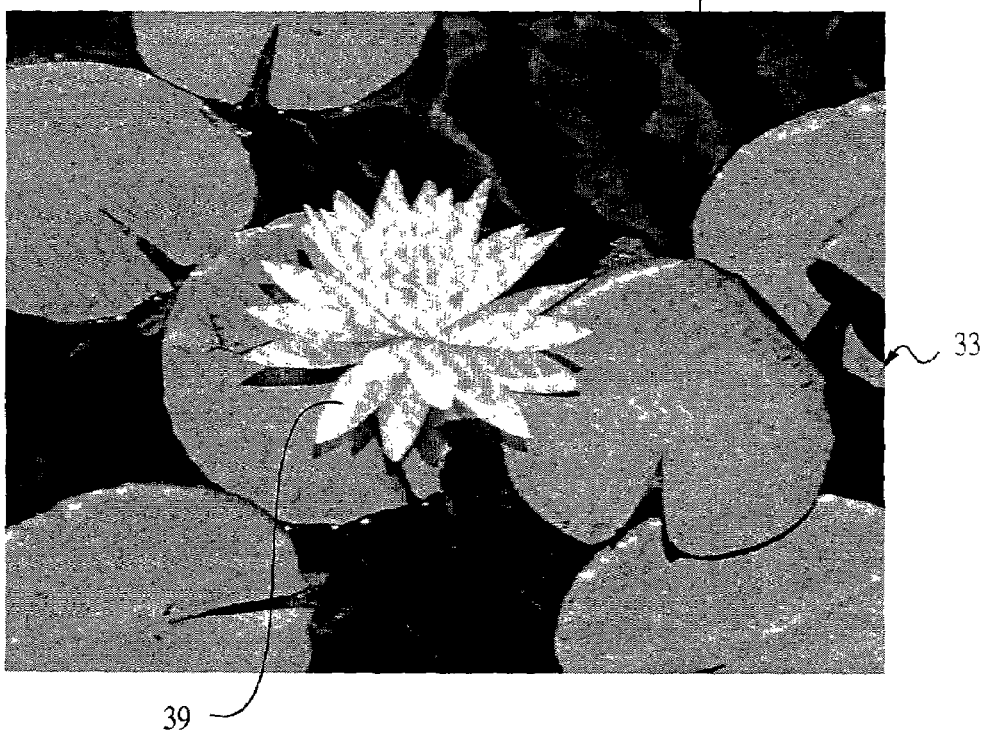
FIG. 5 is an enlarged view of the second thumbnail image of FIG. 3.

If two pictures are taken of the same object and background using the same digital still camera (20) under seemingly identical conditions, the corresponding thumbnail images on LCD screen 28 would appear to the average user to be essentially identical. As illustrated in FIGS. 2-3, thumbnail image 30 and thumbnail image 32 look substantially identical when previewed on LCD screen 28. However, the same images if enlarged and viewed on a computer monitor or printed on high-quality photographic paper may exhibit a noticeable difference in photo quality, as illustrated in FIGS. 4-5. Specifically, water lily 39 and background 41 in enlarged image 33 of FIG. 5, which corresponds to thumbnail image 32 of FIG. 3, appear now somewhat blurry when compared to water lily 35 and background 37 of enlarged image 31 of FIG. 4, which corresponds to thumbnail image 30 of FIG. 2, even though the camera user was shooting in each instance the same scene under substantially the same conditions. A possible cause for the apparent blurriness of FIG. 5 may have been a slight movement of the user's hand, a slight change in focus, viewing angle or the like. In any event, it is virtually impossible for the average user to make an objective preliminary photo quality assessment of the captured image when forced to view thumbnail images on the relatively low resolution and small size camera LCD screen.

Figure 6:
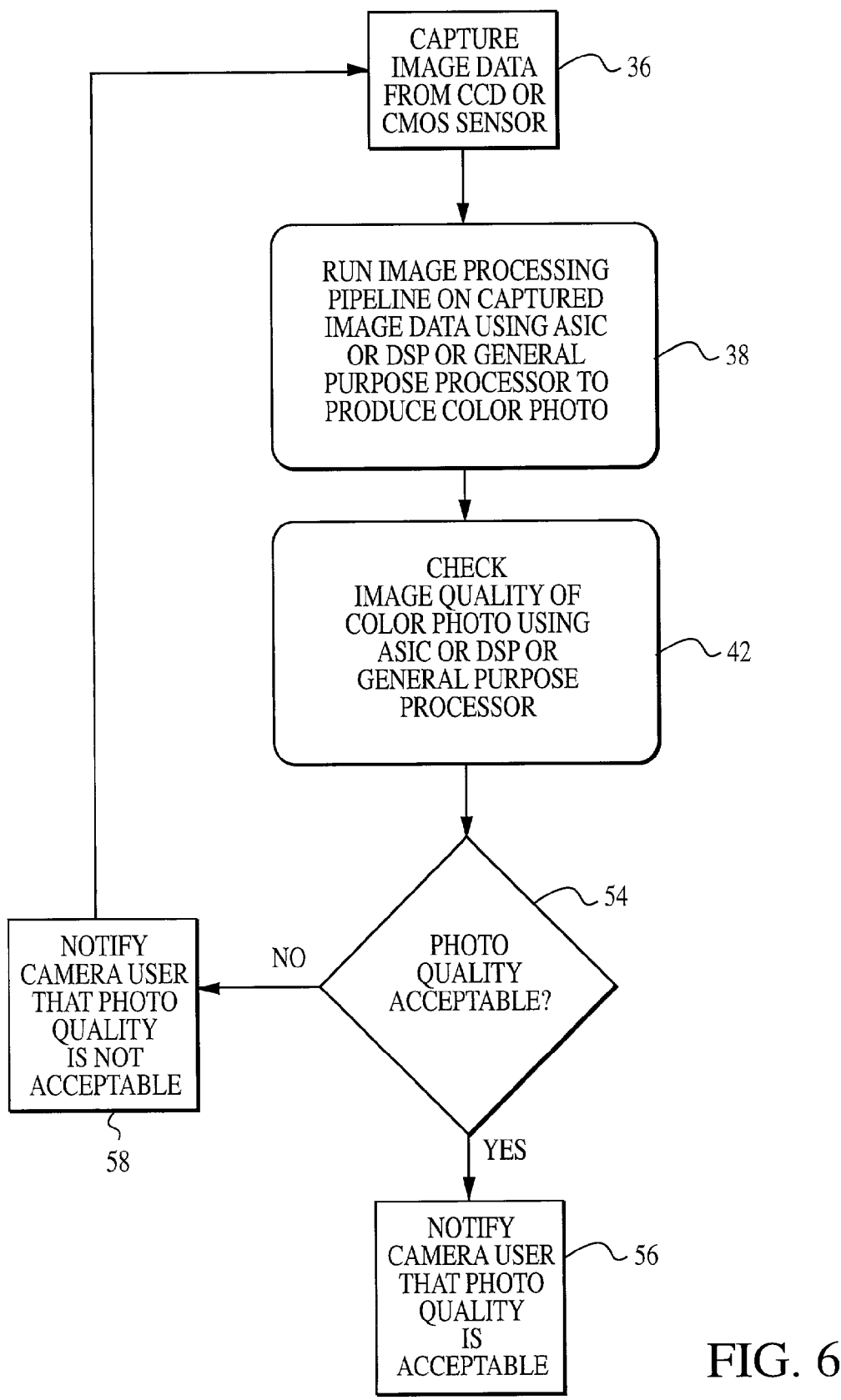
FIG. 6 is an operational flow chart of a process in accordance with one embodiment of the present invention.

As generally illustrated in FIG. 6, image data is captured via a built-in CCD or CMOS sensor (not shown), step 36, and processed in-camera by a conventional digital image processing pipeline to produce a color photo, step 38, that can be previewed on LCD screen 28.

In accordance with a preferred embodiment of the present invention and in a major departure from prior art practice, the captured and processed image data (color photo), instead of being made immediately available for LCD screen previewing, is subjected to additional in-camera image processing using a custom-made built-in ASIC, DSP, or general purpose processor for the purpose of objectively checking the photo quality of the processed image, step 42 (FIG. 6). After the in-camera photo quality check is completed (step 54), digital still camera 20 notifies the user as to whether the photo quality of the processed image is acceptable or not acceptable, steps 56, 58, respectively. This additional in-camera image processing is made possible by programming, preferably at the time of manufacture, the built-in ASIC or DSP or general purpose processor (of digital still camera 20) to evaluate three picture quality attributes, namely, photo sharpness, face quality, and presence/absence of flare. Specifically, the camera ASIC or DSP or general purpose processor is programmed to (a) compute a figure of merit for each of the three picture quality attributes, steps 60, 64 and 68 (FIG. 7), (b) compare each of the computed figures of merit with a respective pre-set threshold value to determine if each figure of merit exceeds its respective threshold, steps 62, 66 and 70 (FIG. 7), and (c) provide appropriate visual and/or audible photo quality feedback to the user, steps 56, 58 (FIG. 6) via LCD preview screen 28.

For example, audible photo quality feedback may be provided by a beeping sound to indicate that there is a problem with one of the (three) picture quality attributes. Visual photo quality feedback may be provided, for example, by displaying text in a pre-determined portion of LCD preview screen 28 to warn the user, e.g., that the image is blurry together with specific instructions on how blurriness may be corrected, e.g., "refocus", "more light", etc. If digital camera 20 detects the presence of flare in the captured image, an appropriate "flare" warning message may be displayed on LCD screen 28 with brief instructions on how to correct, e.g., "avoid window", "change angle", etc.

Figure 8:
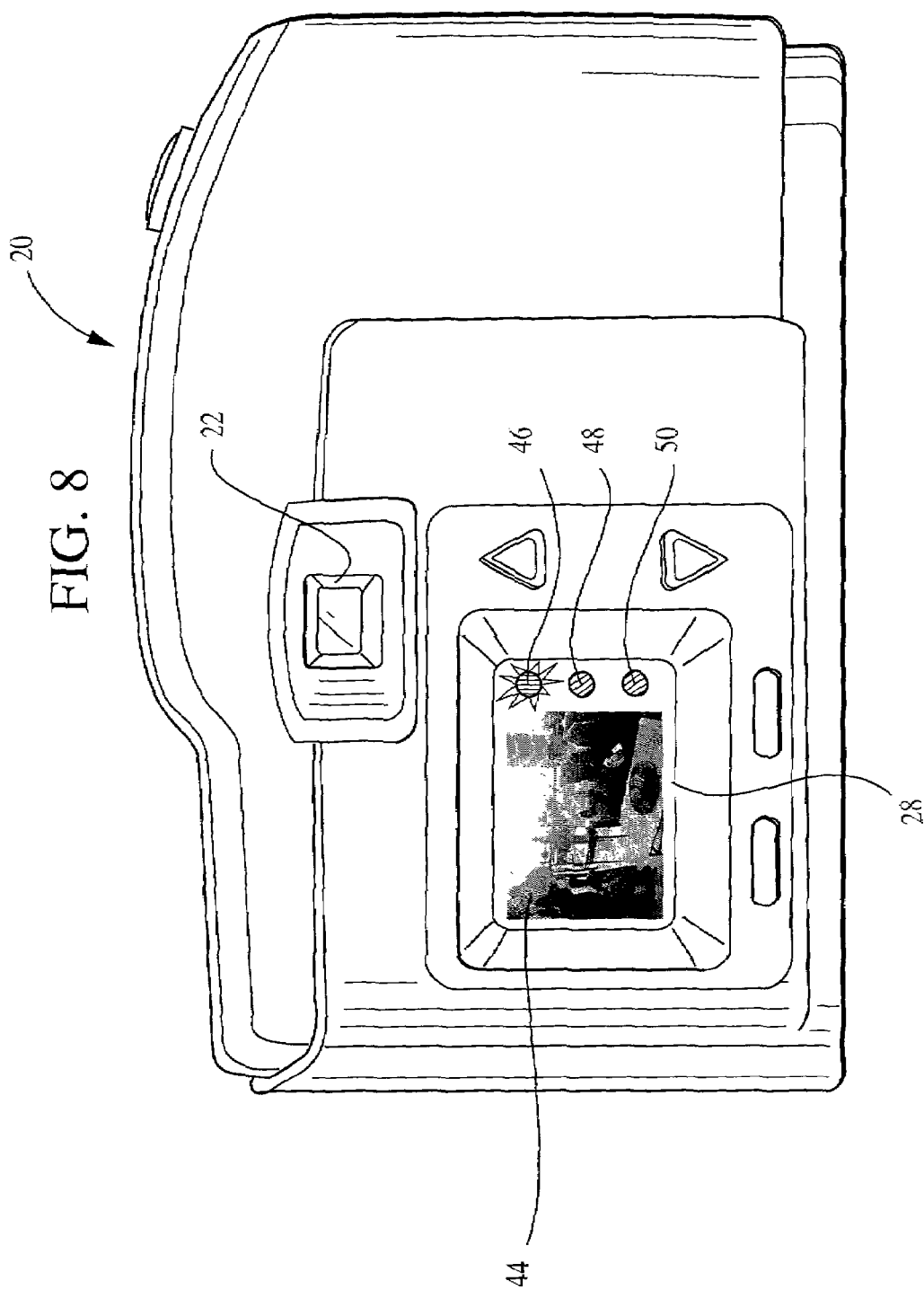
FIG. 8 is a back perspective view of the digital still camera of FIG. 1 in accordance with one embodiment of the present invention.

In one embodiment of the present invention and as generally shown in FIG. 8, LCD preview screen 28 may show several warning lights arranged in a column on one side of a captured (and processed) image 44. For example, warning light 46 may be a flashing red light to indicate that flare is present in image 44. Warning light 48 may be a green light to indicate that face quality (of the persons shown in image 44) is acceptable. Warning light 50, in turn, may be a green light to indicate that no blurriness is present in image 44, i.e. image 44 is sufficiently sharp.

In accordance with another preferred embodiment of the present invention, the built-in ASIC or DSP or general purpose processor of digital still camera 20 may be programmed to evaluate the photo sharpness attribute of a captured and processed image, such as image 30 (FIG. 2), by executing the following one-dimensional gradient algorithm:

Step 1. Generate the line pixel profile (i.e., the profile of a horizontal line across the center for the red channel) of captured (thumbnail) image 30 (FIG. 2). The line pixel profile is plotted in graph 76 (FIG. 9)—red channel gray level versus pixel position.

Figure 9:
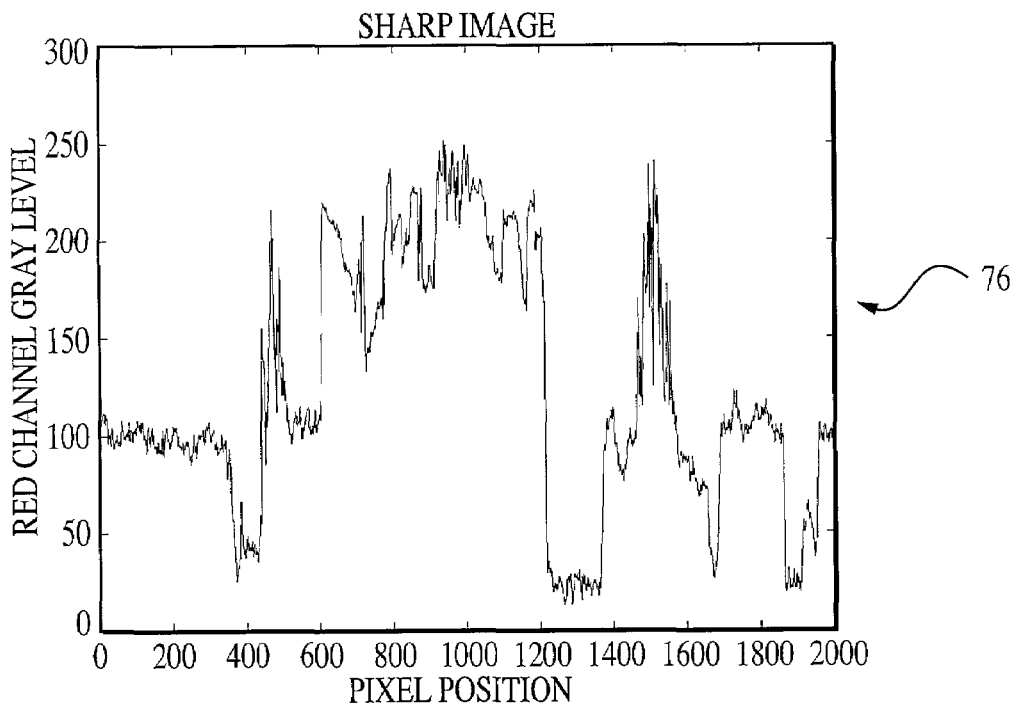
FIG. 9 is a graph of red channel gray level versus pixel position for the image of FIG. 4.

Step 2. Compute the absolute difference in red channel gray level between adjacent pixels in the horizontal direction for captured image 30 using the line pixel profile of image 30 (FIG. 9).

Figure 11:
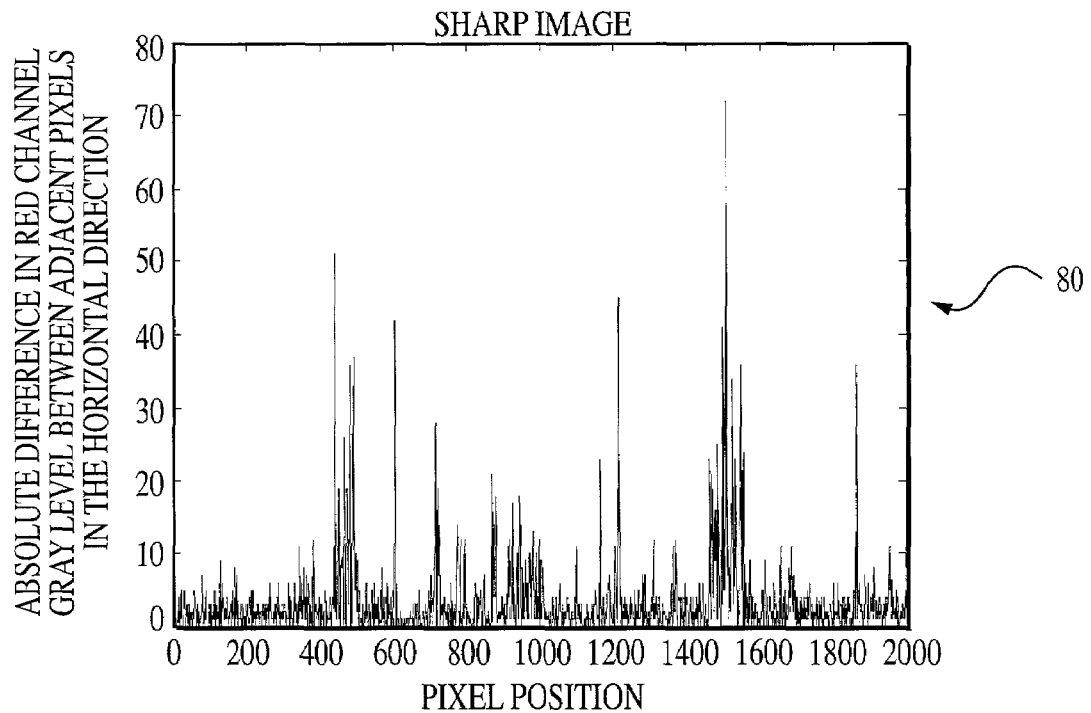
FIG. 11 is a graph of absolute difference in red channel gray level between adjacent pixels versus pixel position for the image of FIG. 4 in accordance with one embodiment of the present invention.

Step 3. Plot the computed absolute difference (in red channel gray level between adjacent pixels in the horizontal direction) versus pixel position for captured image 30, graph 80 (FIG. 11).

Step 4. Pick the maximum absolute difference (in red channel gray level between adjacent pixels in the horizontal direction) as a photo sharpness figure of merit. For example, the maximum absolute difference (in red channel gray level between adjacent pixels in the horizontal direction) in graph 80 (FIG. 11) is about "75" (photo sharpness figure of merit).

Step 5. Determine if the photo sharpness figure of merit exceeds a pre-set photo sharpness threshold. If the photo sharpness figure of merit exceeds the threshold, the captured image is a "sharp image". If the photo sharpness figure of merit does not exceed the threshold, the captured image is a "blurred image". For example, the photo sharpness threshold in graph 80 is shown at "20" (on 'absolute difference' axis, FIG. 11). Since the photo sharpness figure of merit=75>20, captured image 30 is a "sharp image"—see also FIG. 4.

The photo sharpness attribute of captured (thumbnail) image 32 (FIG. 3) may be evaluated by the ASIC or DSP or general purpose processor of digital still camera 20 in the same manner as follows:

Step 1. Generate the line pixel profile (i.e., the profile of a horizontal line across the center for the red channel) of captured image 32 (FIG. 3). The line pixel profile is plotted in graph 78 (FIG. 10)—red channel gray level versus pixel position.

Figure 10:
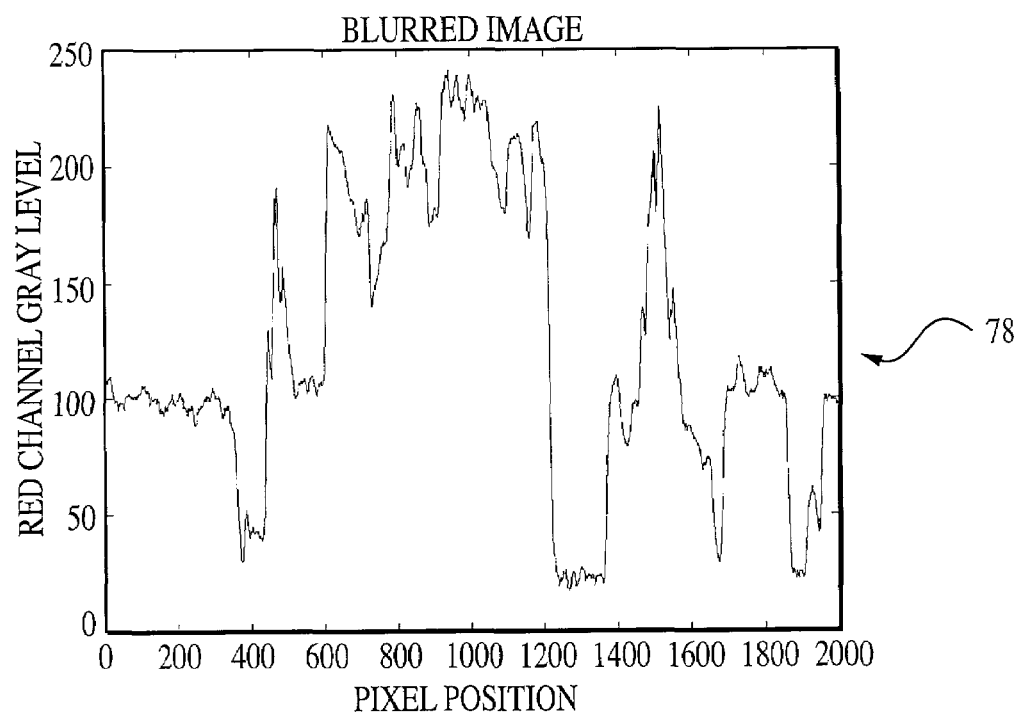
FIG. 10 is a graph of red channel gray level versus pixel position for the image of FIG. 5.

Step 2. Compute the absolute difference in red channel gray level between adjacent pixels in the horizontal direction for captured image 32 (FIG. 3) using the line pixel profile of image 32 (FIG. 10).

Figure 12:
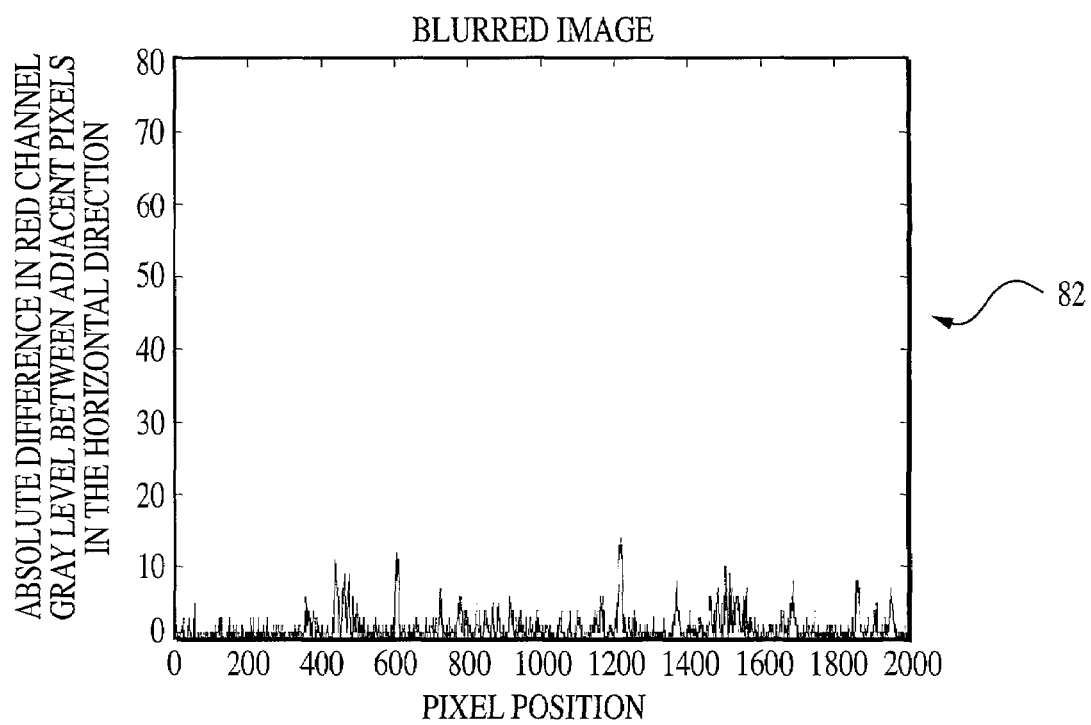
FIG. 12 is a graph of absolute difference in red channel gray level between adjacent pixels versus pixel position for the image of FIG. 5 in accordance with one embodiment of the present invention.

Step 3. Plot the computed absolute difference (in red channel gray level between adjacent pixels in the horizontal direction) versus pixel position for captured image 32, graph 82 (FIG. 12).

Step 4. Pick the maximum absolute difference (in red channel gray level between adjacent pixels in the horizontal direction) as a photo sharpness figure of merit. For example, the maximum absolute difference (in red channel gray level between adjacent pixels in the horizontal direction) in graph 82 (FIG. 12) is about "16" (photo sharpness figure of merit).

Step 5. Determine if the photo sharpness figure of merit exceeds a pre-set photo sharpness threshold. In this case, the photo sharpness threshold in graph 82 is shown at "20" (on 'absolute difference' axis, FIG. 12). Since the photo sharpness figure of merit=16<20, captured image 32 is a "blurred image"—see also blurred water lily 39 and blurred background 41 of image 33 (FIG. 5).

In one example, the following MATLAB™ (a software product of the MathWorks Company of Natick, Mass.) code may be used to generate the graphs of FIGS. 9-12:

```
% read in the sharp image and the blurred image
   a = imread('big.jpg');
   b = imread('big_blur.jpg');
% plot the profile of a horizontal line across the center
   for the red channel of each image
       plot(a(600, 1:2000, 1));
       figure
       plot(b(600, 1:2000, 1));
% calculate the absolute difference between the adjacent pixels
   in the horizontal direction and plot it
       a_int = double(a);
       b_int = double(b);
       for i = 1:2000
   c(i) = abs(a_int(600, i + 1, 1) – a_int(600, i, 1));
       end
       plot(c)
       for i = 1:2000
   d(i) = abs(b_int(600, i + 1, 1) – b_int(600, i, 1));
       end
       plot(d)
```

In accordance with an alternative embodiment of the present invention and in view of the fact that relatively big spikes in absolute difference may sometimes be noise-related, step 4 may be modified from a robustness point of view as follows:

Step 4a. Rank the computed absolute difference values (or data points) in value from large to small. For example, as depicted in graph 80 (FIG. 11), data point 1=75, data point 2=53, datapoint 3=45, . . . , datapoint 2000=0.5.

Step 4b. Drop the top 1% of the data points from photo sharpness figure of merit consideration for robustness. For example, 1% of 2000=20 data points, i.e. data point 1-data point 20, inclusive, will be dropped from figure of merit consideration as these data point values are assumed to be noise-related.

Step 4c. Pick the next top-valued data point as a photo sharpness figure of merit. In this case, data point 21 will be picked as the photo sharpness figure of merit. As long as data point 21 (i.e., the photo sharpness figure of merit) has a value>20, the captured image will be a "sharp image".

The built-in ASIC or DSP or general purpose processor of digital still camera 20 may be programmed to execute the above-described absolute difference robustness (ADR) algorithm. Furthermore, step 4b may be modified to drop not the top 1%, but instead the top 2%, or the top 3%, or the top 4%, etc. from figure of merit consideration depending on the needs of the camera manufacturer as long as such modification does not depart from the spirit and scope of the present invention.

In accordance with another embodiment of the present invention, the photo sharpness attribute of a captured image may be quantitatively evaluated in-camera by programming the built-in ASIC or DSP or general purpose processor of digital still camera 20 at the time of manufacture to execute the following one-dimensional gradient algorithm:

Step 1. Transform captured image data from RGB color space into YCrCb color space. In YCrCb color space, luminance (which corresponds to the brightness of an image pixel) information is stored as a single component (Y) and chrominance (which corresponds to the color of an image pixel) information is stored as two color-difference components (Cb) and (Cr). Cb represents the difference between the blue component and a reference value. Cr represents the difference between the red component and a reference value.

Step 2. Generate the line pixel profile of the transformed image data (not shown).

Step 3. Compute the absolute difference in Y channel gray level between adjacent pixels in the horizontal direction using the generated line pixel profile (not shown).

Step 4. Plot the computed absolute difference versus pixel position (not shown).

Step 5. Pick the maximum absolute difference as a photo sharpness figure of merit. This step may be modified using the above-described ADR algorithm depending on the needs of the camera manufacturer.

Step 6. Determine if the photo sharpness figure of merit exceeds a pre-set photo sharpness threshold "N". If the photo sharpness figure of merit>N, the captured image is a "sharp image". If the photo sharpness figure of merit<N, the captured image is a "blurred image".

In accordance with yet another embodiment of the present invention, the photo sharpness attribute of a captured image may be quantitatively evaluated in-camera by programming the built-in ASIC or DSP or general purpose processor of digital still camera 20 at the time of manufacture to execute the following one-dimensional gradient algorithm:

Step 1. Transform captured image data from RGB color space into C.I.E. (Comission Internationale De L'eclairage) L*a*b* color space. In L*a*b* color space, (L*) represents the luminance (or brightness) component and (a*b*) represent the chrominance components.

Step 2. Generate the line pixel profile of the transformed image data (not shown).

Step 3. Compute the absolute difference in L* channel gray level between adjacent pixels in the horizontal direction using the generated line pixel profile (not shown).

Step 4. Plot the computed absolute difference versus pixel position (not shown).

Step 5. Pick the maximum absolute difference as a photo sharpness figure of merit. This step may be modified using the above-described ADR algorithm depending on the needs of the camera manufacturer.

Step 6. Determine if the photo sharpness figure of merit exceeds a pre-set photo sharpness threshold "P". If the photo sharpness figure of merit>P, the captured image is a "sharp image". If the photo sharpness figure of merit<P, the captured image is a "blurred image".

A person skilled in the art would readily appreciate that variations to the above-described one-dimensional gradient algorithms may utilize green channel, blue channel or vertical direction. Moreover, the algorithms may be modified for use with two-dimensional gradient operators.

Gradient operators of this type are conventionally represented by a pair of masks, $H_1$, $H_2$, which measure the gradient of an image u(m,n) in two orthogonal directions with the magnitude gradient, g(m,n), calculated from g(m,n) $\Delta |g_1(m,n)|+|g_2(m,n)|$, wherein $g_1(m,n)$ and $g_2(m,n)$ are the bi-directional gradients. One common, well-known gradient operator which may be used is the smoothed (Prewift) gradient operator characterized by $$H_1 = \begin{bmatrix} -1 & 0 & 1 \\ -1 & 0 & 1 \\ -1 & 0 & 1 \end{bmatrix} \text{ and } H_2 = \begin{bmatrix} -1 & -1 & -1 \\ 0 & 0 & 0 \\ 1 & 1 & 1 \end{bmatrix}.$$

Other common gradient operators include the Sobel and isotropic gradient operators which together with the smoothed (Prewitt) operator compute horizontal and vertical differences of local sums which reduces the effect of noise in the data. These operators also have the desirable property of yielding zeros for uniform regions. A pixel location (m, n) is declared an edge location if g(m,n) exceeds some threshold T. The locations of edge points constitute an edge map E(m,n) which is defined as follows:

$E(m,n)=1$ if $(m,n) \in I_g$, where $I_g \Delta \{(m,n); g(m,n)>T\}$ $E(m,n)=0$, otherwise The edge map gives the necessary data for tracing the object boundaries in an image. Typically, T may be selected using the cumulative histogram of g(m,n) so that 5% to 10% of pixels with largest gradients are declared as edges. More details on two-dimensional gradient operators may be found in "Fundamentals of Digital Image Processing", A. K. Jain, Prentice Hall, 1989.

In accordance with still another preferred embodiment of the present invention, the photo sharpness attribute of a captured image may be quantitatively evaluated in-camera by programming the built-in ASIC or DSP or general purpose processor of digital still camera 20 at the time of manufacture to execute the following two-dimensional gradient algorithm:

Step 1. Transform captured image data from RGB color space into YCrCb color space.

Step 2. Compute the magnitude of the two-dimensional gradient of the Y component (channel) using the above-identified equations.

Step 3. Plot the computed magnitude of the two-dimensional gradient of the Y component versus pixel position (not shown).

Step 4. Pick the maximum (two-dimensional) gradient magnitude as a photo sharpness figure of merit.

Step 5. Determine if the photo sharpness figure of merit exceeds a pre-set photo sharpness threshold "T". If the photo sharpness figure of merit>T, the captured image is a "sharp image". If the photo sharpness figure of merit<T, the captured image is a "blurred image".

Alternatively, step 4 may be modified from a robustness point of view as follows:

Step 4a. Rank the computed two-dimensional gradient magnitude values (or data points) in value from large to small. For example, data point 1=K1, data point 2=K2, data point 3=K3, data point $f$=Kf, wherein K1>K2>K3> . . . >Kf.

Step 4b. Drop the top 1% of the data points from photo sharpness figure of merit consideration for robustness. For example, 1% of f=0.01f=m data points, i.e. data point 1-data point m, inclusive, will be dropped from figure of merit consideration as these data point values are assumed to be noise-related.

Step 4c. Pick the next top-valued data point as a photo sharpness figure of merit. In this case, data point (m+1) will be picked as the photo sharpness figure of merit. As long as datapoint (m+1) (i.e., the photo sharpness figure of merit) has a value>T, the captured image will be a "sharp image".

The built-in ASIC or DSP or general purpose processor of digital still camera 20 may be programmed to execute the above-described two-dimensional gradient magnitude robustness (2-DGMR) algorithm. Furthermore, step 4b may be modified to drop not the top 1%, but instead the top 2%, or the top 3%, or the top 4%, etc. from figure of merit consideration depending on the needs of the camera manufacturer as long as such modification does not depart from the spirit and scope of the present invention.

In one example, the following MATLAB™ code may be used in conjunction with steps 1-3:

```
a=imread('big.jpg');
b=imread('big_blur.jpg');
a_int=double(rgb2ycbcr(a));
b_int=double(rgb2ycbcr(b));
    for i=2:1500
        for j=2:2000
c(i,j)=abs((a_int(i+1,j-1,1)+a_int(i+1,j,1)+a_int(i+1,j+1,1))-
    (a_int(i-1,j-1,1)+a_int(i-1,j,1)+a_int(i-1,j+1,1)))+
        abs((a_int(i+1,j+1,1)+a_int(i,j+1,1)+a_
int(i-1,j+1,1) )-(a_int(i-1,j-1,1)+a_int(i,j-1,1)+a_int(i+1,j-1,1)));
        end
    end
    for i=2:1500
        for j=2:2000
        a(i,j,1)=c(i,j)/3;
        a(i,j,2)=c(i,j)/3;
        a(i,j,3)=c(i,j)/3;
        end
    end
    image(a);
    figure;
    for i=2:1500
        for j=2:2000
d(i,j)=abs((b_int(i+1,j-1,1)+b_int(i+1,j,1)+b_int(i+1,j+1,1))-
    (b_int(i-1,j-1,1)+b_int(i-1,j,1)+b_int(i-1,j+1,1)))+
        abs((b_int(i+1,j+1,1)+b_int(i,j+1,1)+b
        end
    end
    for i=2:1500
        for j=2:2000
        b(i,j,1)=d(i,j)/3;
```

-continued

```
        b(i,j,2)=d(i,j)/3;
        b(i,j,3)=d(i,j)/3;
            end
        end
    image(b);
```

In accordance with an alternative embodiment of the present invention, a photo sharpness figure of merit may be computed in-camera by executing the following two-dimensional gradient algorithm:

Step 1. Transform captured image data from RGB color space into L*a*b* color space.

Step 2. Compute the magnitude of the two-dimensional gradient of the L* component using the above equations.

Step 3. Plot the magnitude of the two-dimensional gradient of the L* component versus pixel position (not shown).

Step 4. Pick the maximum (two-dimensional) gradient magnitude as a photo sharpness figure of merit. This step may be modified using the above-described 2-DGMR algorithm depending on the needs of the camera manufacturer.

Step 5. Determine if the photo sharpness figure of merit exceeds a pre-set photo sharpness threshold "M". If the photo sharpness figure of merit>M, the captured image is a "sharp image". If the photo sharpness figure of merit<M, the captured image is a "blurred image".

A photo sharpness threshold for digital still camera 20 may be set at the time of manufacture by performing a so-called "knife-edge" test on digital still camera 20 to determine how the camera responds to a sharp edge. Every digital still camera has a certain frequency response which can be measured by this test. Specifically, the test uses a knife edge target disposed at a slight angle to the columns of the CCD array. The pitch of the knife edge relative to the column is preferably at least 10:1, i.e. the knife edge traverses 10 rows while crossing one column of pixels. The edge, when used in this manner, magnifies the line spread function. The data read from a single column has to cross ten rows in order to get a complete edge trace, in other words, the magnification of the spread function is 10:1. The edge data taken along a column is then converted directly to second moment data which in turn can be converted to the modulation transfer function and then to an photo quality metric. More details on the knife edge test may be found, for example, in Edward M. Granger, X-Rite, Inc., Grandville, Mich., "Photo quality Of Digital Cameras", pp. 188-191, IS&T's 1998 PICS Conference.

Alternatively and in accordance with a preferred embodiment of the present invention, a digital camera manufacturer may take a series of test pictures under ideal conditions and compute the maximum first level gradient present in each picture. A threshold is determined by selecting the minimum first level gradient of all the computed first level gradient maxima. The threshold is then programmed into the built-in ASIC or DSP or general purpose processor of digital still camera 20.

The above-described tests and algorithms are useful for globally blurred captured images. When certain portions of a captured image are blurry and other portions are sharp, a region of interest (e.g., a face region) may be detected using conventional detection methods with the above-described techniques applied only to the detected region of interest for photo sharpness evaluation.

Figure 7:
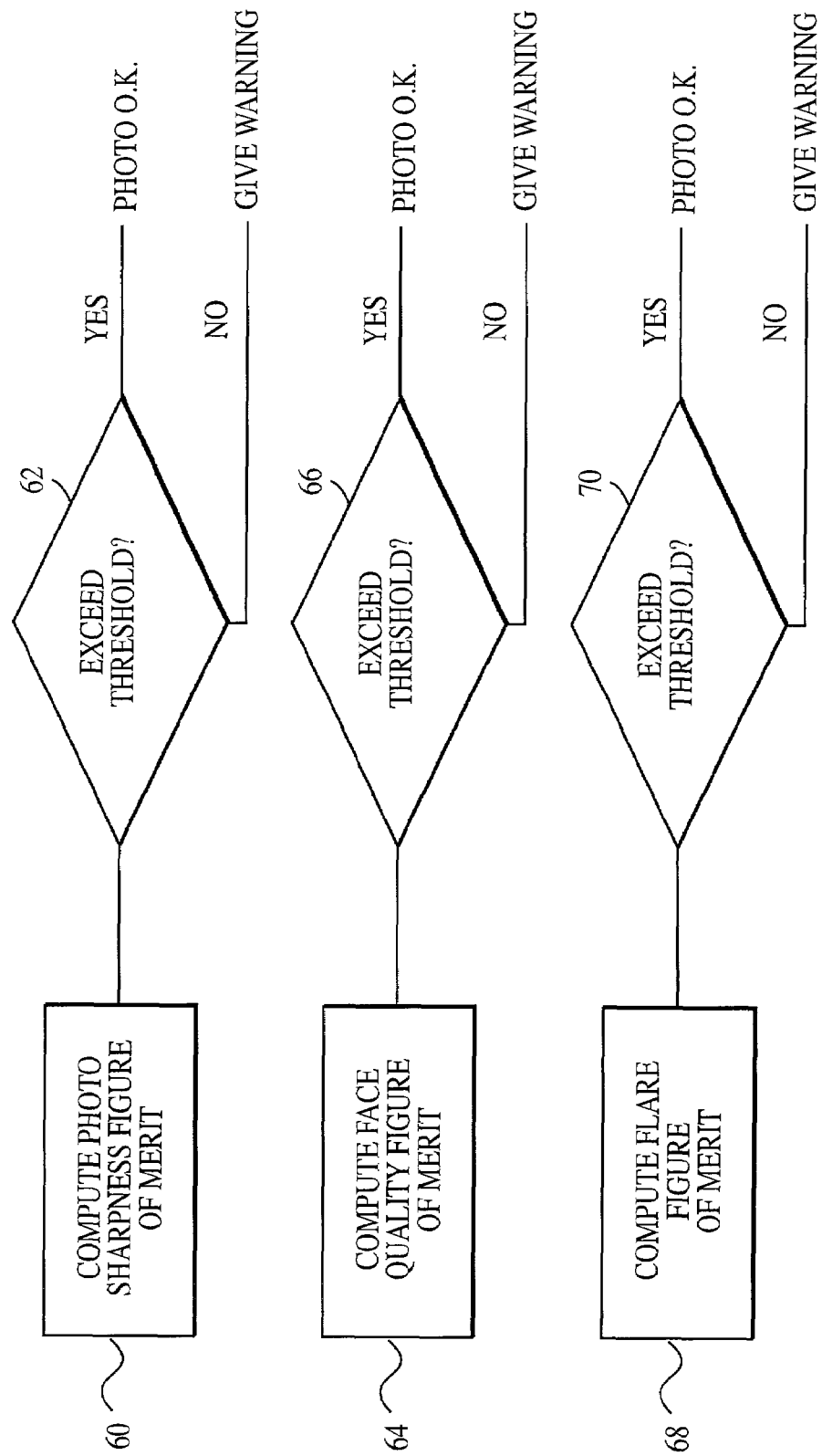
FIG. 7 is an operational flow chart of another process in accordance with one embodiment of the present invention.

The face quality attribute may be evaluated in-camera using various conventional face and eye detection algorithms to detect face and eye regions and then compute a face quality figure of merit in the detected regions, step 64 (FIG. 7). The computed face quality figure of merit is compared to a pre-set threshold, step 66 (FIG. 7), to determine if the figure of merit exceeds the threshold. If the figure of merit exceeds the threshold, the face quality of the captured (and processed) image is acceptable. Otherwise, face quality is not acceptable and an appropriate warning is issued to the camera user in the manner described hereinabove.

Computing a face quality figure of merit is done in several steps. Specifically, the built-in ASIC or DSP or general purpose processor of digital still camera 20 is programmed to compute: (a) a brightness figure of merit, (b) a noise level figure of merit, (c) a contrast figure of merit, and (d) to check for presence/absence of red eye in the respective detected regions.

A suitable face detection algorithm is described, for example, in an article entitled "Efficient Face Detection For Multimedia Applications" by Nicolas Tsapatsoulis, Yannis Avrithis and Stefanos Kollias, Proceedings ICIP 2000, IEEE International Conference on Image Processing, September 2000, Vancouver, Canada. The algorithm combines the well-known multi-resolution recursive shortest spanning tree (M-RSST) color segmentation algorithm with a Gaussian model of skin color distribution and global shape features and subsequently associates the resultant segments with a face probability which can be indexed and used to retrieve facial images from multimedia databases. Specifically, in a first stage, the M-RSST color segmentation algorithm is applied to the image/frame under examination. In a second stage, each segment is associated with a skin color probability and shape constraints are taken into account in a third stage in order to provide an estimate of the overall face probability. This algorithm is more efficient in face detection than other known algorithms in that segments rather than macroblocks or pixels are associated with skin color probability. Segment probabilities serve as system outputs and are used for facial indexing and retrieval. Since every segment retains its probability, algorithm performance may be extended by using adaptive skin color models. Face segments with low probabilities can be reassessed after adaptation. In addition, segments are less sensitive to lighting conditions than pixels or macroblocks. This is rather advantageous since face shape is more efficiently captured and may be used in the last stage to move from skin color probability to face probability. More details on the face detection algorithm may be found in the above-identified publication.

A suitable eye detection algorithm is described, for example, in an article entitled "Detection Of Eyes From Human Faces By Hough Transform And Separability Filter" by Tsuyoshi Kawaguchi, Daisuke Hidaka and Mohamed Rizon, Proceedings ICIP 2000, IEEE International Conference on Image Processing, September 2000, Vancouver, Canada. The algorithm deals with detection of irises of both eyes from a human face in an intensity image. The image is preferably a head-shoulder image with plain background. The irises of both eyes must appear in the image, i.e. the head rotation about the y-axis is about (−30 degrees, 30 degrees). Using a Fukui and Yamaguchi separability filter, the algorithm first extracts intensity valleys or "blobs" as possible candidates for the irises and then computes a cost for each pair of blobs using Hough transform and separability filter to measure the fit of the blob pair against the image. The algorithm is programmed to select the blob pair with the smallest cost as the irises of both eyes. The last step involves the following sub-steps: (a) normalizing the scale, translation and orientation of the eye template so that the centers of the two irises in the template are placed at the centers of the two blobs, (b) computing the normalized cross-correlation value between the template and the image using the Fukui and Yamaguchi separability filter, and (c) if the normalized cross-correlation value between the template and the image is <0.1, setting the normalized cross-correlation value=0.1. The Fukui and Yamaguchi separability filter is described, for example, in K. Fukui and O. Yamaguchi, "Facial Feature Point Extraction Method Based On Combination Of Shape Extraction And Pattern Matching", IEICE Transactions, Vol. J80-D-II, No. 8, pp. 2170-2177, 1997. One advantage of this eye detection algorithm is that there is no need to normalize the size and orientation of the face in the image as practiced in other known eye detection algorithms utilizing template matching or principal component analysis. More details on this eye detection algorithm may be found in the above-identified Kawaguchi, et al publication.

A person skilled in the art would readily recognize that other known face and/or eye detection algorithms may be used as long as such other algorithms fall within the scope of the present invention.

Figure 13:
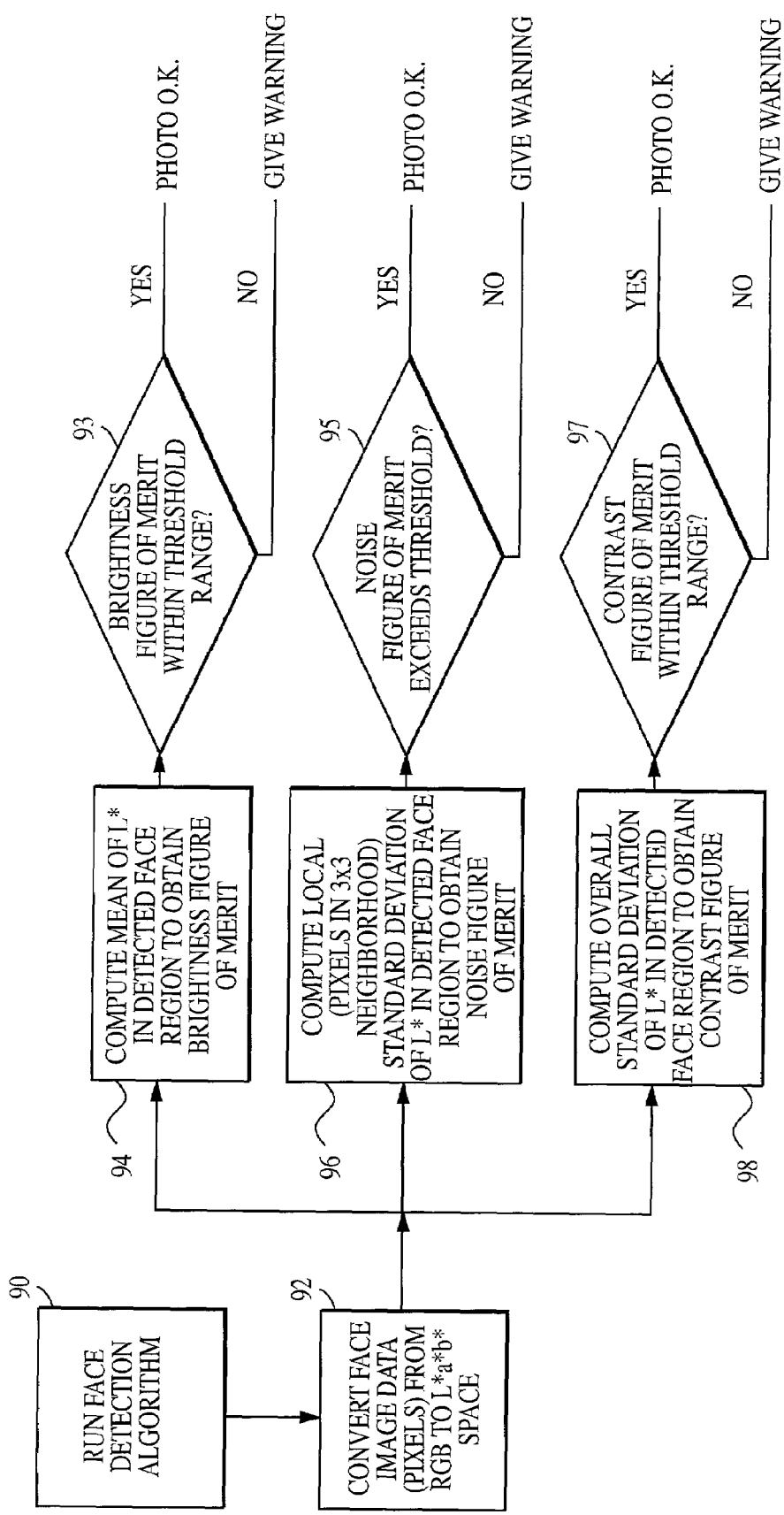
FIG. 13 is an operational flow chart of still another process in accordance with one embodiment of the present invention.

Brightness, in general, may be defined as the attribute of a visual sensation according to which an area appears to exhibit more or less light. Various prior studies have shown that camera users prefer to view photos and/or digital images with certain levels of brightness and contrast, i.e. there are desirable or so-called "target" or "threshold" levels for mean and standard deviation of the pixel values in a detected face region. Once a face region has been detected, step 90 (FIG. 13), the brightness figure of merit may be computed by programming the built-in ASIC or DSP or general purpose processor of digital still camera 20 at the time of manufacture to execute the following algorithm:

Step 1. Convert captured face image data from RGB color space to L*a*b* color space, step 92 (FIG. 13).

Step 2. Compute the mean of L* in the detected face region, step 94 (FIG. 13) to obtain a brightness figure of merit ignoring the (a*b*) component.

Step 3. Determine if the computed brightness figure of merit is within a pre-set brightness threshold range "B". If the brightness figure of merit falls within B, the detected face image data is bright enough. If the brightness figure of merit does not fall within B, the detected face image data is not bright enough and digital still camera 20 issues an appropriate audible and/or visual warning to the user.

A pre-set brightness threshold (or target) range may be obtained in a subjective image quality study. A digital image with people as the main subject may be adjusted in brightness and evaluated accordingly by a great number of test camera users. The users' preference for brightness in the facial region may be recorded. When a face in the picture becomes too dark or too bright, the users' preference normally goes down and a threshold or target range is reached when most of the camera users agree on the boundaries of the range, i.e. respective upper and lower contrast levels beyond which image quality becomes degraded. The brightness target/threshold range is then programmed into the logic circuits of the built-in ASIC or DSP or general purpose processor of digital still camera 20.

A noise figure of merit may be computed by programming the built-in ASIC or DSP or general purpose processor of digital still camera 20 at the time of manufacture to execute the following algorithm:

Step 1. Convert captured face image data from RGB color space to L*a*b* color space, step 92 (FIG. 13).

Step 2. Compute the local standard deviation of L* (using pixels in the 3×3 immediate neighborhood) in the detected face region, step 96 (FIG. 13) to obtain a noise figure of merit ignoring the (a*b*) component.

Step 3. Determine if the computed noise figure of merit exceeds a pre-set noise threshold "F", step 95 (FIG. 13). If the noise figure of merit>F, the noise level in the detected face image data is acceptable. If the noise figure<F, the noise level in the detected face image data is not acceptable and digital still camera 20 issues an appropriate audible and/or visual warning to the user.

A noise threshold may be determined in a subjective image quality study, similar to the above-described brightness range study. Specifically, a digital image with people as the main subject may be adjusted for noise level and evaluated accordingly by a great number of test camera users. The users' preference for noise level in the facial region is recorded. When the test users agree that a certain noise level is too high (unacceptable), a noise threshold is reached. The noise threshold is then programmed into the logic circuits of the built-in ASIC or DSP or general purpose processor of digital still camera 20.

A contrast figure of merit may be computed by programming the built-in ASIC or DSP or general purpose processor of digital still camera 20 at the time of manufacture to execute the following algorithm:

Step 1. Convert captured face image data from RGB color space to L*a*b* color space, step 92 (FIG. 13).

Step 2. Compute the overall standard deviation of L* in the detected face region, step 98 (FIG. 13) to obtain a contrast figure of merit ignoring the (a*b*) component.

Step 3. Determine if the computed contrast figure of merit is within a pre-set contrast threshold range "C", step 97 (FIG. 13). If the contrast figure of merit falls within C, the detected facial image data has enough contrast. If the contrast figure of merit does not fall within C, the detected facial image data does not have enough contrast and digital still camera 20 issues an appropriate audible and/or visual warning to the user.

A pre-set contrast "target" or "threshold" range may be obtained in a subjective image quality study similar to the above-described brightness and noise level image quality studies. Specifically, the test camera users' preference for contrast in the facial region is tested and recorded. A contrast threshold (target) range is reached when most of the test users agree on the boundaries of the contrast range, i.e. respective upper and lower contrast levels beyond which image quality becomes degraded. The contrast threshold range is then programmed into the logic circuits of the built-in ASIC or DSP or general purpose processor of digital still camera 20.

Presence or absence of red eye in a detected eye region may be computed in-camera by programming the built-in ASIC or DSP or general purpose processor of digital still camera 20 to utilize techniques generally disclosed in U.S. Pat. No. 6,016,354 to Lin (inventor in the instant application) et al, entitled "Apparatus and A Method For Reducing Red-Eye in a Digital Image", the contents of which is incorporated herein by reference. Specifically, a masking module is used to read the color image of a marked area and convert the color image pixel data into a binary mask in which each of the pixels is either a "white" pixel or a "black" pixel. The binary mask may be of the same size as the marked area of the original image or smaller in size than the marked area. The binary mask is used to identify all the red pixels in the marked area and thus includes first stage regions which indicate red color pixels and second stage regions which indicate pixels having colors other than red. The first stage regions are represented by white (highest gray scale value) pixels, while the second stage regions are represented by black (lowest gray scale value) pixels. If the gray scale value is represented by eight-bit data, the highest gray scale value is 255 and the lowest gray scale value is 0. If the binary mask has no white pixels, then red eye is not present. If the binary mask contains white pixels, then red eye is present and can be automatically flagged with an appropriate audible/visual warning issued to the camera user. More details on this technique may be found, for example, in Col. 5, Lines 5-67 and Col. 6, Lines 1-49, inclusive, of U.S. Pat. No. 6,016,354.

Presence or absence of flare in a captured digital image may be evaluated in-camera by programming the camera ASIC or DSP or general purpose processor at the time of manufacture to compute a flare figure of merit (step 68, FIG. 7) which is then compared to a pre-set threshold to determine if the flare figure of merit exceeds the threshold (step 70, FIG. 7). Specifically, the camera ASIC, or DSP or general purpose processor is programmed to detect areas in a captured digital image, such as image 84 (FIG. 14), are substantially white—RGB pixel levels of (255, 255, 255).

Figure 14:
FIG. 14 is a photo taken with the digital still camera of FIG. 1 exhibiting a flare problem.

Flare, in general, becomes a problem when there are a large number of saturated pixels in a continuous region (FIG. 14). In-camera flare detection preferably involves the following steps:

Step 1. Generate a binary mapping or image 86 (FIG. 15) of captured image 84. In general, binary images are images whose pixels have only two possible intensity values. Numerically, the two values are often 0 for black, and either 1 or 255 for white. Binary images normally are displayed in black and white and are usually produced by thresholding a grayscale or color image in order to separate an object or region (in the image) from its background. The color of the object (usually white) is referred to as foreground color. The rest (usually black) is referred to as background color. Depending on the image which is to be thresholded, this polarity may be inverted, in which case the object is displayed with a zero value while the background is displayed with a non-zero value.

Step 2. Subdivide binary mapping 86 into a number of regions, e.g., 5×5 regions (FIG. 15).

Step 3. Count the number of saturated (white) pixels in each region of FIG. 15 to compute a percentage of saturated (white) pixels therein. For example, region 88 (FIG. 15) contains predominantly saturated (white) pixels.

Step 4. Determine if the percentage of saturated (white) pixels (flare figure of merit) in at least one region (e.g. region 88 of FIG. 15) exceeds a pre-set threshold (percentage). The threshold should be at least 50% in accordance with the best mode for practicing the invention. If the flare figure of merit in at least one region>50%, then flare is present in digital image 84 (FIG. 14). A corresponding audible or visual warning may then be given to the camera user, e.g., in the form of a red warning light 46 (FIG. 8) or a brief text message displayed on a pre-determined portion of LCD screen 28 advising the camera user "to avoid bright areas" such as windows, "reposition camera", etc. (not shown). If the flare figure of merit in each region (of binary image 86)<50%, then flare is not present in digital image 84 (FIG. 14).

Figure 15:
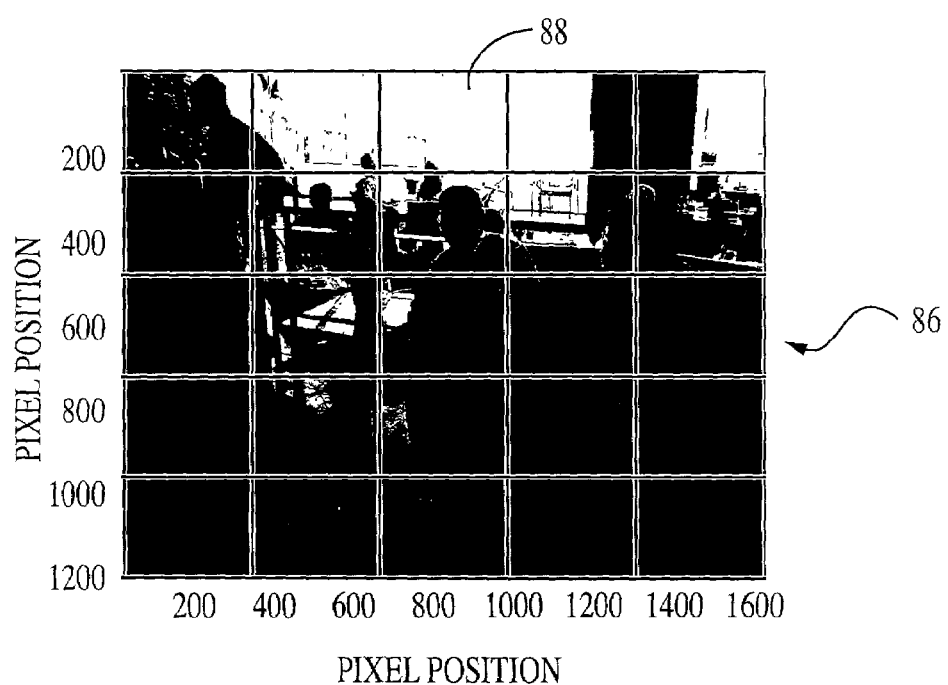
FIG. 15 is a binary mapping of the photo of FIG. 14 in accordance with one embodiment of the present invention.

In one example, the following MATLAB™ code may be used to generate a binary mapping of the type shown in FIG. 15:

```
a=imread('dsc00001.jpg');
b=imread('dsc00001.jpg');
  for i=1:1200
    for j=1:1600
        count=0;
        b(i,j,1)=0;
        b(i,j,2)=0;
        b(i,j,3)=0;
        if a(i,j, 1)>200
            count=1;
        end
        if a(i,j,2)>200
            count=2;
        end
        if a(i,j,3)>200
            count=3;
        end
        if count ==3
            b(i,j,1)=255;
            b(i,j,2)=255;
            b(i,j,3)=255;
        end
    end
  end
image(b)
```

If digital still camera 20 detects no problems with each of the three above-described photo quality attributes, the camera user is notified that the photo quality of the captured image is of acceptable quality (step 56, FIG. 6). Such notification may take the form, for example, of three green lights displayed on one side of LCD screen 28, as generally depicted in FIG. 8. Other types and/or modes of notification may be utilized, provided such other types and/or modes of notification do not deviate from the intended purpose of the present invention.

A person skilled in the art would appreciate that in-camera evaluation of each of the three photo quality attributes may be performed in parallel or in series depending on how the respective ASIC, or DSP or general purpose processor of digital camera 20 is configured by the camera manufacturer.

Figure 16:
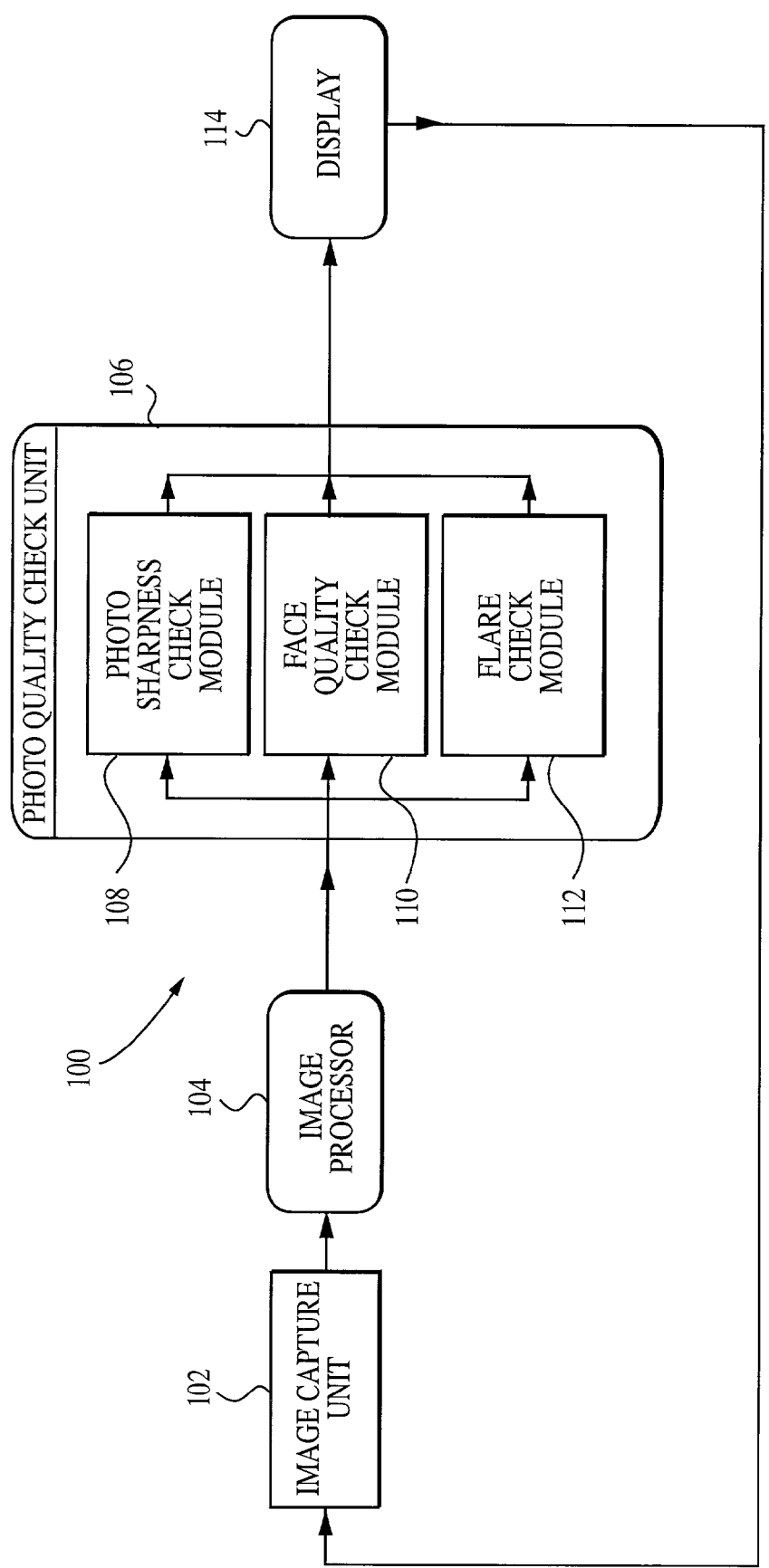
FIG. 16 is a block diagram of a system for assessing the photo quality of a captured image in a digital still camera in accordance with one embodiment of the present invention.

As illustrated in FIG. 16, the present invention is also directed to a system, generally referred to by a reference numeral 100, for assessing in-camera the photo quality of a captured image to provide a digital still camera user with photo quality feedback. System 100 comprises an image capture unit 102, which may include a CCD or CMOS sensor (not shown), an image processor 104 and a photo quality check unit 106 operatively coupled between image processor 104 and a display or LCD preview screen 114. Image processor 104 may include a built-in ASIC or DSP or a general purpose processor to run the image processing pipeline on captured image data.

In accordance with a preferred embodiment of the present invention, photo quality check unit 106 comprises a photo sharpness check module 108, a face quality check module 110 and a flare check module 112. Each of the three modules (108, 110, 112) may be implemented on an ASIC or DSP or general purpose processor and is intended to function respectively in the manner described hereinabove in reference to FIGS. 6-15. Each of the three modules (108, 110, 112) may or may not be implemented on the same ASIC or DSP or general purpose processor depending on camera configuration.

The order in which the captured (and processed by image processor 104) image data is processed by each module (108, 110, 112) may be performed in parallel (FIG. 16) or in series (not shown). If photo sharpness check module 108 detects blurriness in the captured and processed image (color photo), an appropriate audible/visual warning is provided on display 114. If face quality check module 110 detects, for example, the presence of red eye in the color photo, a respective audible/visual warning is provided on display 114 for the camera user. If flare check module 112 detects flare in the color photo, a respective audible/visual warning is provided on display 114 for the camera user. If all three modules detect no problems with the color photo, digital camera 20 issues an appropriate audible/visual notification to the user. Such notification, for example, may be in the form of three green lights displayed in a column on one side of display 114 (not shown), or the like.

What is claimed is:

1. A method for assessing the photo quality of a captured image in a digital camera, said method comprising:
   checking, in-camera, the photo quality of the captured image to determine if the photo quality is acceptable; and
   providing a corresponding photo quality feedback to a camera user, wherein the checking step comprises:
      computing a photo sharpness figure of merit for the captured image; and
      comparing said computed photo sharpness figure of merit to a threshold to determine if said photo sharpness figure of merit exceeds said threshold, the computing step further comprising:
         generating a line pixel profile of the captured image;
         computing an absolute difference in a channel gray level between adjacent pixels in the horizontal direction using said line pixel profile; and
         picking the maximum absolute difference as the photo sharpness figure of merit.

2. The method of claim 1 further comprising:
   transforming the captured image from RGB color space into YCrCb color space.

3. The method of claim 1 further comprising:
   transforming the captured image from RGB color space into L*a*b color space.

4. A method for assessing the photo quality of a captured image in a digital camera, said method comprising:
   checking, in-camera, the photo quality of the captured image to determine if the photo quality is acceptable; and
   providing a corresponding photo quality feedback to a camera user, wherein the checking step comprises:
      computing a photo sharpness figure of merit for the captured image; and
      comparing said computed photo sharpness figure of merit to a threshold to determine if said photo sharpness figure of merit exceeds said threshold, the computing step further comprising:
         generating a line pixel profile of the captured image;
         computing the absolute difference in a channel gray level between adjacent pixels in the horizontal direction using said line pixel profile, said computed absolute difference constituting a plurality of data points;
         ranking said data points in value;
         dropping at least a top 1% of said ranked data points from consideration; and
         picking a next top-valued data point as the photo sharpness figure of merit.

5. The method of claim 4 further comprising:
   transforming the captured image from RGB color space into YCrCb color space.

6. The method of claim 4 further comprising:
   transforming the captured image from RGB color space into L*a*b color space.

7. A method for assessing the photo quality of a captured image in a digital camera, said method comprising:
   checking, in-camera, the photo quality of the captured image to determine if the photo quality is acceptable; and
   providing a corresponding photo quality feedback to a camera user, wherein the checking step comprises:
      computing a photo sharpness figure of merit for the captured image; and
      comparing said computed photo sharpness figure of merit to a threshold to determine if said photo sharpness figure of merit exceeds said threshold, the computing step further comprising:
         computing a magnitude of a two-dimensional gradient of a channel; and
         picking a maximum two-dimensional gradient magnitude as the photo sharpness figure of merit.

8. The method of claim 7 further comprising:
   transforming the captured image from RGB color space into YCrCb color space.

9. The method of claim 7 further comprising:
   transforming the captured image from RGB color space into L*a*b color space.

10. A method for assessing the photo quality of a captured image in a digital camera, said method comprising:
    checking, in-camera, the photo quality of the captured image to determine if the photo quality is acceptable; and
    providing a corresponding photo quality feedback to a camera user, wherein the checking step comprises:
       computing a photo sharpness figure of merit for the captured image; and
       comparing said computed photo sharpness figure of merit to a threshold to determine if said photo sharpness figure of merit exceeds said threshold, the computing step further comprising:
          computing a magnitude of a two-dimensional gradient of a channel, said computed two-dimensional gradient magnitude constituting a plurality of data points;
          ranking said data points in value;
          dropping at least a top 1% of said ranked data points from consideration; and
          picking a next top-valued data point as the photo sharpness figure of merit.

11. The method of claim 10 further comprising:
    transforming the captured image from RGB color space into YCrCb color space.

12. A method for assessing the photo quality of a captured image in a digital camera, said method comprising:
    checking, in-camera, the photo quality of the captured image to determine if the photo quality is acceptable; and
    providing a corresponding photo quality feedback to a camera user wherein said checking step further comprises:
       computing a face quality figure of merit for the captured image; and
       comparing said computed face quality figure of merit to a threshold to determine if said face quality figure of merit exceeds said threshold.

13. The method of claim 12 wherein the computing step comprises:
    detecting facial image data from the captured image; and converting said detected facial image data from RGB color space into L*a*b color space.

14. The method of claim 13 further comprising:
computing the mean of L* to obtain a brightness figure of merit;
determining if said brightness figure of merit falls within a brightness threshold range.

15. The method of claim 13 further comprising:
computing the local standard deviation of L* to obtain a noise figure of merit; and
determining if said noise figure of merit exceeds a noise threshold.

16. The method of claim 13 further comprising:
computing the overall standard deviation of L* to obtain a contrast figure of merit; and
determining if said contrast figure of merit falls within a contrast threshold range.

17. The method of claim 12 wherein the computing step comprises:
detecting facial image data from the captured image; and
converting said detected facial image data into a binary mask of only white and black pixels, wherein said white pixels represent pixels of red color and said black pixels represent pixels of colors other than red; and
checking said binary mask for presence of white pixels.

18. A method for assessing the photo quality of a captured image in a digital camera, said method comprising:
checking, in-camera, the photo quality of the captured image to determine if the photo quality is acceptable; and
providing a corresponding photo quaiity feedback to a camera user, said checking step further comprising:
computing a flare figure of merit for the captured image;
comparing said computed flare figure of merit to a threshold to determine if said flare figure or merit exceeds said threshold; and
providing a corresponding flare feedback to said camera user wherein the computing step comprises:
generating a binary mapping of the captured image containing only black and white pixels, said white pixels representing saturated pixels of the captured image; and
subdividing said binary mapping into a plurality of regions.

19. The method of claim 18 further comprising:
computing a percentage of white pixels in each region to obtain a flare figure of merit; and
determining if said flare figure of merit in at least one region exceeds a flare threshold.

20. The method of claim 19 wherein said flare threshold is at least 50%.

21. A method for assessing the photo quality of a captured image in a digital camera, said method comprising the steps of:
computing, in-camera, a photo sharpness figure of merit for the captured image;
comparing, in-camera, said computed photo sharpness figure of merit to a threshold to determine if said photo sharpness figure or merit exceeds said threshold;
providing a corresponding photo sharpness feedback to a camera user;
computing, in-camera, a face quality figure of merit for the captured image;
comparing, in-camera, said computed face quality figure of merit to a threshold to determine if said face quality figure of merit exceeds said threshold;
providing a corresponding face quality feedback to said camera user;
computing, in-camera, a flare figure of merit for the captured image;
comparing, in-camera, said computed flare figure of merit to a threshold to determine if said flare figure of merit exceeds said threshold; and
providing a corresponding flare feedback to said camera user.

22. A system for assessing the photo quality of a captured image in a digital camera, said system comprising:
an image capture unit;
an image processor operatively coupled to said image capture unit for processing the captured image;
a photo quality check unit operatively coupled to said image processor for checking, in-camera, the photo quality of the processed image; and
a display operatively coupled to said photo quality check unit for providing a corresponding photo quality feedback to a camera user, wherein said photo quality check unit comprises:
a photo sharpness check module operatively coupled between said image processor and said display for checking in-camera the photo sharpness of the processed image;
a face quality check module operatively couple between said image processor and said display for checking in-camera the face quality of the processed image; and
a flare check module operatively coupled between said image processor and said display for checking in-camera the processed image for presence of flare.

23. The method of claim 12, wherein the computing of the thee quality figure of merit comprises computing:
a brightness figure of merit;
a noise level figure of merit; and a contrast figure of merit and checking for a presence or an absence of red eye.

* * * * *

UNITED STATES PATENT AND TRADEMARK OFFICE
CERTIFICATE OF CORRECTION

PATENT NO. : 7,362,354 B2
APPLICATION NO. : 10/074179
DATED : April 22, 2008
INVENTOR(S) : Qian Lin It is certified that error appears in the above-identified patent and that said Letters Patent is hereby corrected as shown below:

In column 8, line 62, below "abs((b_int(i+1,j+1,1)+b_int(i,j+1,1)+b" insert --_int(i-1,j+1,1))-(b_int(i-1,j-1,1)+b_int(i,j-1,1)+b_int(i+1,j-1,1)));--.

In column 16, line 3, in Claim 6, delete "L*a*b" and insert --L*a*b*--, therefor.

In column 16, line 26, in Claim 9, delete "L*a*b" and insert --L*a*b*--, therefor.

In column 17, line 2, in Claim 13, delete "L*a*b" and insert --L*a*b*--, therefor.

In column 17, line 18, in Claim 17, after "wherein" delete "the".

In column 17, line 31, in Claim 18, delete "quaiity" and insert --quality--, therefor.

In column 18, line 49, in Claim 23, delete "thee" and insert --face--, therefor.

Signed and Sealed this

Twenty-seventh Day of January, 2009

JOHN DOLL
*Acting Director of the United States Patent and Trademark Office*